United States Patent
Selvaraj et al.

(10) Patent No.: US 12,354,068 B2
(45) Date of Patent: Jul. 8, 2025

(54) REMOTE DEVICE CONTROL BASED ON DEEP LINKING

(71) Applicant: Bank of America Corporation, Charlotte, NC (US)

(72) Inventors: Rajeswari Selvaraj, Harrisburg, NC (US); Abhijit Behera, Hyderabad (IN); Madhusekhar Banda, Hyderabad (IN); Maneesh Kumar Sethia, Telangana (IN)

(73) Assignee: Bank of America Corporation, Charlotte, NC (US)

(*) Notice: Subject to any disclaimer, the term of this patent is extended or adjusted under 35 U.S.C. 154(b) by 115 days.

(21) Appl. No.: 18/197,154

(22) Filed: May 15, 2023

(65) Prior Publication Data
US 2024/0386407 A1  Nov. 21, 2024

(51) Int. Cl.
| | |
|---|---|
| *G06Q 20/10* | (2012.01) |
| *G06Q 20/18* | (2012.01) |
| *G06Q 20/32* | (2012.01) |
| *G06Q 20/40* | (2012.01) |
| *G07F 19/00* | (2006.01) |
| *H04W 4/80* | (2018.01) |
| *H04W 76/10* | (2018.01) |

(52) U.S. Cl.
CPC .......... *G06Q 20/108* (2013.01); *G06Q 20/18* (2013.01); *G06Q 20/3221* (2013.01); *G06Q 20/3224* (2013.01); *G06Q 20/3267* (2020.05); *G06Q 20/40155* (2020.05); *H04W 4/80* (2018.02); *H04W 76/10* (2018.02)

(58) Field of Classification Search
CPC .. G06Q 20/108; G06Q 20/18; G06Q 20/3221; G06Q 20/3224; G06Q 20/3267; G06Q 20/40155; H04W 4/80; H04W 76/10
USPC .......................................................... 705/42
See application file for complete search history.

(56) References Cited

U.S. PATENT DOCUMENTS

| | | | |
|---|---|---|---|
| 8,332,320 B2 | 12/2012 | Singh | |
| 8,972,297 B2 * | 3/2015 | Kay | ....... G07F 19/211 705/1.1 |
| 9,685,034 B2 | 6/2017 | Weber et al. | |
| 10,055,726 B2 | 8/2018 | Kursun et al. | |
| 11,089,107 B1 * | 8/2021 | Chor | ....... H04L 63/08 |

(Continued)

*Primary Examiner* — Clifford B Madamba
(74) *Attorney, Agent, or Firm* — Banner & Witcoff, Ltd.

(57) ABSTRACT

Arrangements for remote device control and transaction processing are provided. In some aspects, a local computing device may initiate a communication session with the self-service kiosk. The local computing device may capture self-service kiosk identifying data and may generate a deep link to an application. The local computing device may transmit the deep link and self-service kiosk identifying information to a remote computing device. An indication of selection of the deep link may be received by the local computing device and a remote transaction processing session may be initiated at the self-service kiosk. The self-service kiosk may transmit a user interface for display by the remote computing device. An option from the user interface may be selected for processing. The self-service kiosk may process the selected option, send a notification of transaction completion to the remote user computing device and terminate the communication session with the local user computing device.

20 Claims, 15 Drawing Sheets

(56) References Cited

U.S. PATENT DOCUMENTS

| | | |
|---|---|---|
| 11,232,517 B1 | 1/2022 | Medina et al. |
| 11,829,988 B2 * | 11/2023 | Iqbal .................. G06Q 20/3224 |
| 11,887,110 B2 * | 1/2024 | Laracey .................. G06F 21/35 |
| 2019/0173994 A1 | 6/2019 | Ivashyn |
| 2024/0202714 A1 * | 6/2024 | Laracey ............. G06Q 20/3224 |

* cited by examiner

400

*Welcome!*

What Can We Help You With Today?

[ Option 1 ]

[ Option 2 ]

[ Remote Transaction ]

*A Remote Transaction Session Is Being Initiated At A Self-Service Kiosk At:*

| XXX Main Street Town, State, USA |

Please Click The Following Link To Continue This Session

*https://xxxx.com/path/page*

[ *Cancel* ]

FIG. 5

REMOTE DEVICE CONTROL BASED ON DEEP LINKING

BACKGROUND

Aspects of the disclosure relate to electrical computers, systems, and devices for remote control of devices, such as self-service kiosks, based on deep linking.

It is sometimes difficult or impossible for a user to go to a self-service kiosk to process a transaction, such as withdrawing funds, depositing checks or funds, or the like. For instance, people may have limited ability to travel to the self-service kiosk, might not have sufficient time to visit the self-service kiosk, or the like. Accordingly, it may be advantageous to enable an authorized user to visit the self-service kiosk to process the transaction for the user who is unable to visit the self-service kiosk. However, in conventional systems, the user visiting the self-service kiosk would have to possess both a card and personal identification number (PIN) to conduct the transaction for the user. This may pose a security concern for the user unable to visit the self-service kiosk. Accordingly, aspects described herein provide remote control of the self-service kiosk by a user located remotely from the self-service kiosk, via a user computing device of an authorized user located proximate to the self-service kiosk.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical issues associated with providing secure remote control of devices and access to remote transaction processing.

In some aspects, a local user computing device within a predefined range of a self-service kiosk may initiate a communication session with the self-service kiosk. In some examples, the communication session may be initiated via short range wireless communication protocols. Upon initiating the connection, the local user computing device may capture self-service kiosk identifying data, such as a unique identifier of the self-service kiosk, geographic coordinates of a location of the self-service kiosk, and the like. The local user computing device may generate a deep link to an application executing on the local user computing device and the remote user computing device. The local user computing device may transmit the deep link and self-service kiosk identifying information to the remote user computing device. In some examples, the user may select the deep link to initiate the remote transaction processing session.

An indication of selection of the deep link may be received by the local user computing device and an instruction to initiate the remote transaction processing session may be transmitted to the self-service kiosk. The self-service kiosk may transmit one or more user interfaces that may be relayed, by the local user computing device, to the remote user computing device and displayed by the remote user computing device. The user interfaces may mimic user interfaces provided by the self-service kiosk during local transaction processing. Accordingly, the remote user may select, via a user interface, one or more selectable options for transaction processing. The selected option may be transmitted to the local user computing device and self-service kiosk for processing. In some examples, the self-service kiosk may process the selected option, send a notification of transaction completion to the remote user computing device and terminate the communication session with the local user computing device.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 4-7 illustrate example user interfaces that may be generated in accordance with one or more aspects described herein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, some people may have difficulty or find it impossible to visit a self-service kiosk to conduct transactions. Accordingly, it may be advantageous to provide a secure system for permitting a remote user to remotely access a self-service kiosk to conduct transactions.

For instance, aspects described herein rely on deep linking to connect a remote user computing device, located remotely from the self-service kiosk and mobile computing device of a local user proximate the self-service kiosk, to the mobile computing device of the user proximate the self-service kiosk and self-service kiosk. Once a connection is established, the mobile computing device of the user proximate the self-service kiosk may convey user interfaces from the self-service kiosk to the remote user computing device. Selection of one or more options may be made by the remote user via the remote user computing device, transmitted to the mobile computing device of the local user proximate to the self-service kiosk, that may then orchestrate processing of the requested selected options. Accordingly, the local user proximate the self-service kiosk may act on behalf of the remote user to obtain funds, complete a deposit, or the like, without requiring the card, password, personal identification number, or the like, of the remote user.

These and various other arrangements will be discussed more fully below.

Figure 1A:
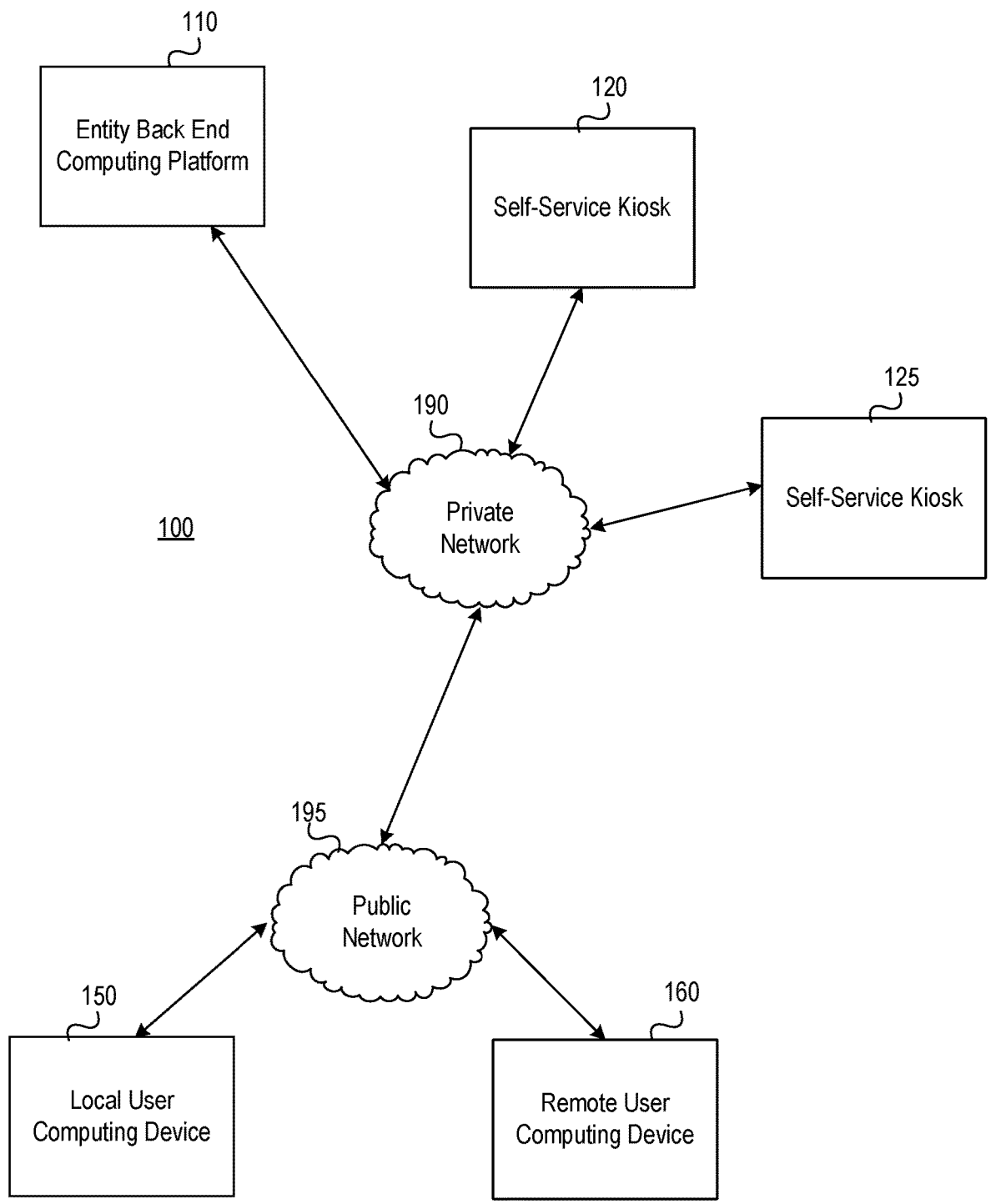
FIGS. 1A-1C depict an illustrative computing environment for implementing remote device control and transaction processing functions in accordance with one or more aspects described herein.
Figure 1B:
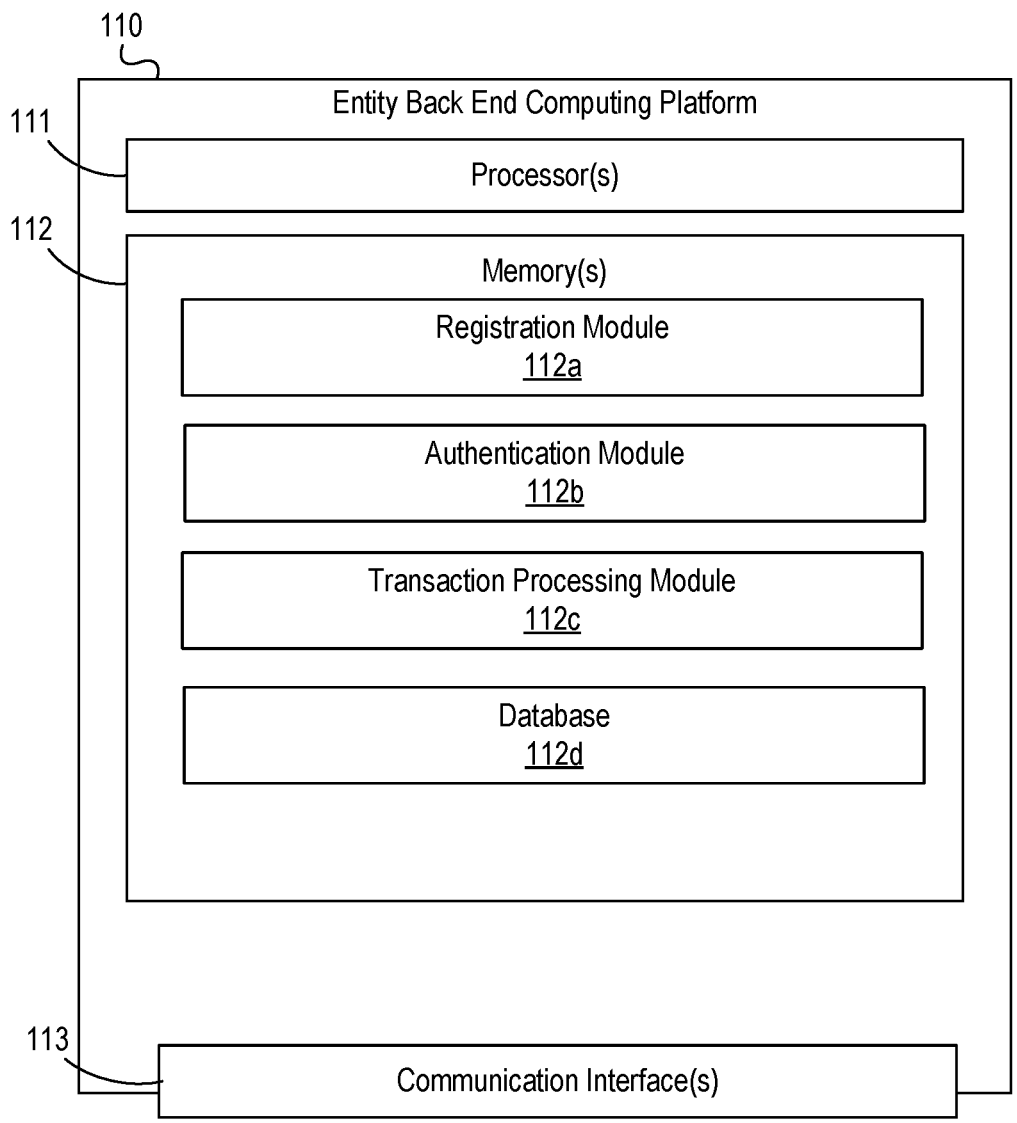
Figure 1C:
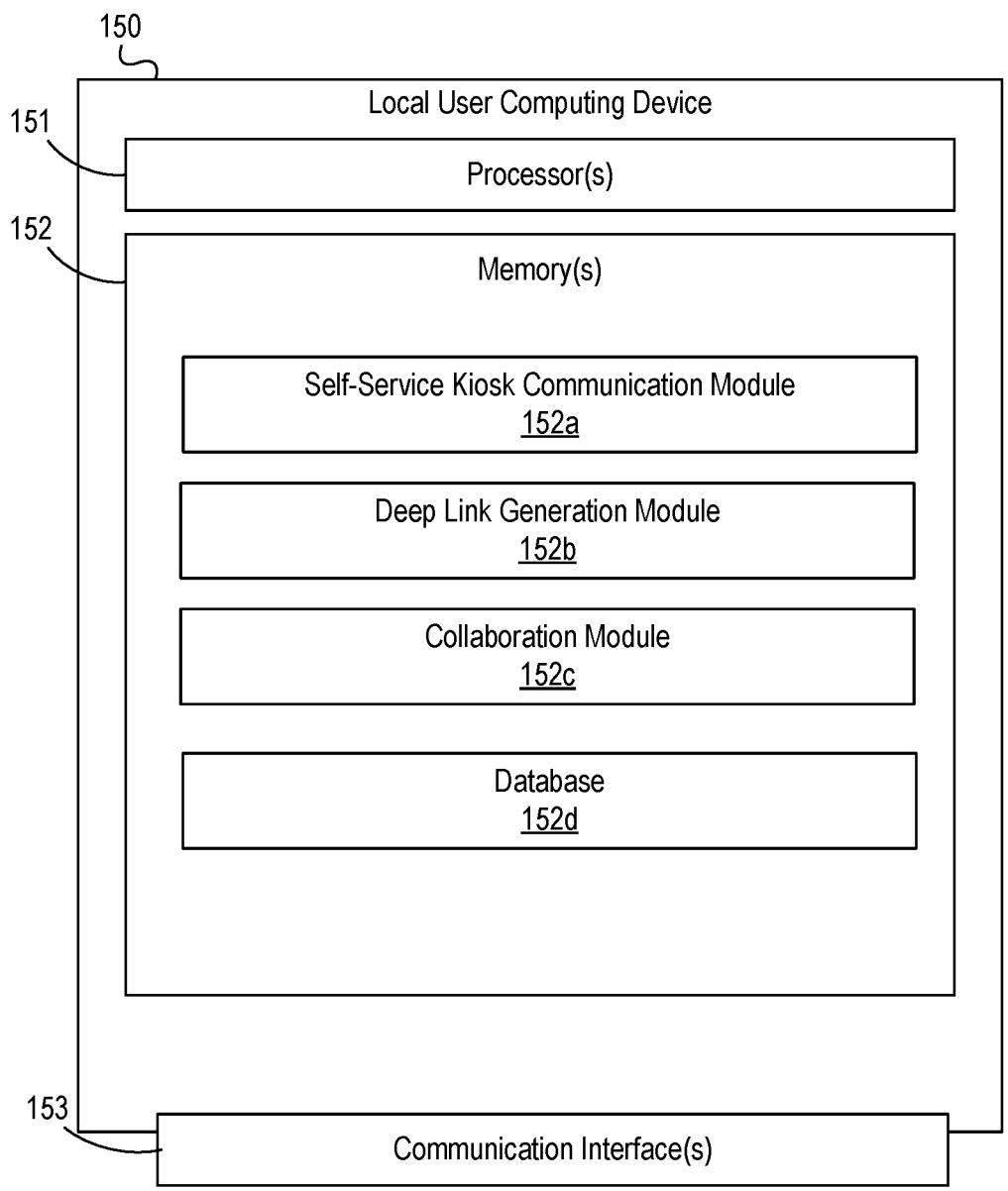

Aspects described herein may be implemented using one or more computing devices operating in a computing environment. For instance, FIGS. 1A-1C depict an illustrative computing environment for implementing remote device control based on deep linking in accordance with one or more aspects described herein. Referring to FIG. 1A, computing environment 100 may include one or more computing devices and/or other computing systems. For example, computing environment 100 may include an entity back end computing platform 110, self-service kiosk 120, self-service kiosk 125, local user computing device 150, and/or remote user computing device 160. Although two self-service kiosks 120, 125 and two user computing devices 150, 160 are shown, any number of systems or devices may be used without departing from the invention.

Entity back end computing platform 110 may be or include one or more computing devices (e.g., servers, server blades, or the like) and/or one or more computing components (e.g., memory, processor, and the like) and may be configured to enable remote device control processes based on registration data of users, authenticate users requesting remote device control and transaction processing, process transactions as requested by a self-service kiosk, such as self-service kiosk 120, 125 and the like. Entity back end computing platform 110 may communicate with one or more entity systems hosting services to provide account access, update account ledgers, and the like. In some examples, entity back end computing platform 110 may store authentication data that may be used to authenticate a user to a self-service kiosk prior to requesting and/or processing a transaction.

Self-service kiosk 120 and/or self-service kiosk 125 may be or include one or more computing devices (e.g., servers, server blades, or the like) and/or one or more computing components (e.g., memory, processor, and the like) and may be configured to receive and process transaction requests (e.g., cash withdrawals, balance transfers, deposits, or the like). Self-service kiosk 120 and/or self-service kiosk 125 may include automated teller machines (ATMs), automated teller assistants (ATAs), self-service point-of-sale systems, or the like. Self-service kiosk 120 and/or self-service kiosk 125 may be configured to display one or more user interfaces, each user interface including a plurality of selectable options associated with various functionality of the self-service kiosk 120, 125. In some examples, self-service kiosk 120 and/or self-service kiosk 125 may include short-range wireless communication capabilities, such as near field communication, Bluetooth LE, and the like. Self-service kiosk 120 and/or self-service kiosk 125 may be configured to connect (e.g., via a short-range wireless communication protocol) to local user computing device 150 when local user computing device 150 is within a predetermined distance or range from the self-service kiosk 120 and/or self-service kiosk 125, to enable remote control of the self-service kiosk 120, 125 via the local user computing device 150.

Local user computing device 150 may be or include one or more mobile computing devices, such as a smart phone or other smart device, wearable device, laptop computer, tablet computer, or the like. Local user computing device 150 may be configured to connect to a self-service kiosk, such as self-service kiosk 120 or self-service kiosk 125, to capture identifying data of the self-service kiosk, and facilitate transaction processing via the self-service kiosk when the local user computing device 150 is within range of the self-service kiosk 120, 125. In some examples, local user computing device 150 may include a mobile application executing thereon and associated with an entity or enterprise organization (e.g., a mobile banking application of the financial institution associated with the self-service kiosk being used). Local user computing device 150 may be configured to generate a deep link to the application and transmit the deep link to a remote user computing device 160 located remotely from the self-service kiosk 120 and the local user computing device 150. Upon activation of the deep link, local user computing device 150 may be configured to transmit one or more display screens of the self-service kiosk to the remote user computing device 160 thereby mimicking user interfaces typically accessible on the display of the self-service kiosk 120 on the remote user computing device 160. Local user computing device 150 may further be configured to receive user selections made via the remote user computing device 160, and/or facilitate processing of the requested selections or transactions via the self-service kiosk 120, 125 and entity back end computing platform 110.

Remote user computing device 160 may be or include one or more user computing devices, such as mobile computing devices (e.g., laptops, tablets, smart phones, wearable devices, or the like), desktop computing devices, or the like. Remote user computing device 160 may be associated with a remote user and located remotely from the self-service kiosk and local user computing device 150. Remote user computing device 160 may be configured to receive a deep link, select the deep link to initiate communication between the local user computing device 150 and the remote user computing device 160, display mimicked user interfaces received from the local user computing device 150, make selections via a touchscreen or other input device of the remote user computing device 160, and the like.

As mentioned above, computing environment 100 also may include one or more networks, which may interconnect one or more of entity back end computing platform 110, self-service kiosk 120, self-service kiosk 125, local user computing device 150, and/or remote user computing device 160. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, entity back end computing platform 110, self-service kiosk 120, and/or self-service kiosk 125, may be associated with an enterprise organization (e.g., a financial institution), and private network 190 may be associated with and/or operated by the organization, and may include one or more networks (e.g., LANs, WANs, virtual private networks (VPNs), or the like) that interconnect entity back end computing platform 110, self-service kiosk 120, and/or self-service kiosk 125, and one or more other computing devices and/or computer systems that are used by, operated by, and/or otherwise associated with the organization. Public network 195 may connect private network 190 and/or one or more computing devices connected thereto (e.g., entity back end computing platform 110, self-service kiosk 120, and/or self-service kiosk 125) with one or more networks and/or computing devices that are not associated with the organization. For example, local user computing device 150 and/or remote user computing device 160 might not be associated with an organization that operates private network 190 (e.g., because local user computing device 150 and/or remote user computing device 160 may be owned, operated, and/or serviced by one or more entities different from the organization that operates private network 190, one or more customers of the organization, one or more employees of the organization, public or government entities, and/or vendors of the organization, rather than being owned and/or operated by the organization itself), and public network 195 may include one or more networks (e.g., the internet) that connect local user computing device 150 and/or remote user computing device 160 to private network 190 and/or one or more computing devices connected thereto (e.g., entity back end computing platform 110, self-service kiosk 120, and/or self-service kiosk 125).

Referring to FIG. 1B, entity back end computing platform 110 may include one or more processors 111, memory 112, and communication interface 113. A data bus may interconnect processor(s) 111, memory 112, and communication interface 113. Communication interface 113 may be a network interface configured to support communication between entity back end computing platform 110 and one or more networks (e.g., network 190, network 195, or the like). Memory 112 may include one or more program modules having instructions that when executed by processor(s) 111 cause entity back end computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of entity back end computing platform 110 and/or by different computing devices that may form and/or otherwise make up entity back end computing platform 110.

For example, memory 112 may have, store and/or include registration module 112a. Registration module 112a may store instructions and/or data that may cause or enable the entity back end computing platform 110 to receive requests for registration from one or more users and associated user devices. In some examples, the registration data received in the requests for registration may include user identifiers, account identifiers, device identifiers (e.g., international mobile equipment identity (IMEI) number, device phone number, and the like), and the like. In some examples, the registration data may include authentication data (e.g., username and password, personal identification number, biometric data, and the like) that may, in some examples, be used to authenticate a user to an application executing on a user device (e.g., local user computing device 150, remote user computing device 160, or the like), to initiate a transaction, or the like.

Entity back end computing platform 110 may further have, store and/or include authentication module 112b. Authentication module 112b may store instructions and/or data that may cause or enable the entity back end computing platform 110 to receive a request to access an entity application executing on a device, generate a request for authentication data, compare received authentication response data to pre-stored data, generate an authentication response, and the like. In some examples, authentication module 112b may use authentication data received during a registration process to authenticate a user.

Entity back end computing platform 110 may further have, store and/or include transaction processing module 112c. Transaction processing module 112c may store instructions and/or data that may cause or enable the entity back end computing platform 110 to receive (via self-service kiosk 120, self-service kiosk 125, or the like) requests for transaction processing and process the requested transactions. In some examples, processing the transaction may include communicating with one or more other entity systems to modify an account ledger, verify account balances, and the like.

Entity back end computing platform 110 may further have, store and/or include a database 112d. Database 112d may store registration data, authentication data, and/or other data to enable performance of the processes associated with entity back end computing platform 110.

Referring to FIG. 1C, local user computing device 150 may include one or more processors 151, memory 152, and communication interface 153. A data bus may interconnect processor(s) 151, memory 152, and communication interface 153. Communication interface 153 may be a network interface configured to support communication between local user computing device 150 and one or more networks (e.g., network 190, network 195, or the like). Memory 152 may include one or more program modules having instructions that when executed by processor(s) 151 cause local user computing device 150 to perform one or more functions described herein and/or one or more databases that may store and/or otherwise maintain information which may be used by such program modules and/or processor(s) 151. In some instances, the one or more program modules and/or databases may be stored by and/or maintained in different memory units of local user computing device 150 and/or by different computing devices that may form and/or otherwise make up local user computing device 150.

For example, memory 152 may have, store and/or include self-service kiosk communication module 152a. Self-service kiosk communication module 152a may store instructions and/or data that may cause or enable the local user computing device 150 to detect a self-service kiosk 120 within proximity of the local user computing device 150 and initiate a communication session with the self-service kiosk 120 (e.g., via near field communication, or the like). After a handshake operation to establish a communication session, self-service kiosk communication module 152a may capture identifying information of the self-service kiosk 120, such as a unique identifier of the self-service kiosk 120, geo-coordinates of the self-service kiosk 120 (e.g., longitude and latitude), and the like.

Local user computing device 150 may further have, store and/or include deep link generation module 152b. Deep link generation module 152b may store instructions and/or data that may cause or enable the local user computing device 150 to dynamically generate a deep link to a function associated with the entity application executing on the local user computing device and a remote user computing device 160. For instance, deep link generation module 152b may generate a deep link to a mobile banking application executing on both devices 150 and 160. In some examples, the dynamically generated deep link may include identification of the self-service kiosk 120 at which the local user computing device 150 is located.

Local user computing device 150 may further have, store and/or include collaboration module 152c. Collaboration module 152c may store instructions and/or data that may cause or enable the local user computing device 150 to transmit the dynamically generated deep link to remote user computing device 160 (e.g., located remotely from the self-service kiosk 120 and the local user computing device 150) and, upon selection of the deep link, establish a connection with the remote user computing device 160, transmit mimicked self-service kiosk 120 user interfaces, relay user input selections received from the remote user computing device 160 to the self-service kiosk 120, and the like.

Local user computing device 150 may further have, store and/or include database 152d. Database 152d may store self-service kiosk data, deep link data, and/or other data used by local user computing device 150 to perform the functions and processes described herein.

FIGS. 2A-2H depict one example illustrative event sequence for implementing remote device control and transaction processing functions in accordance with one or more aspects described herein. The events shown in the illustrative event sequence are merely one example sequence and additional events may be added, or events may be omitted, without departing from the invention. Further, one or more processes discussed with respect to FIGS. 2A-2H may be performed in real-time or near real-time.

Figure 2A:
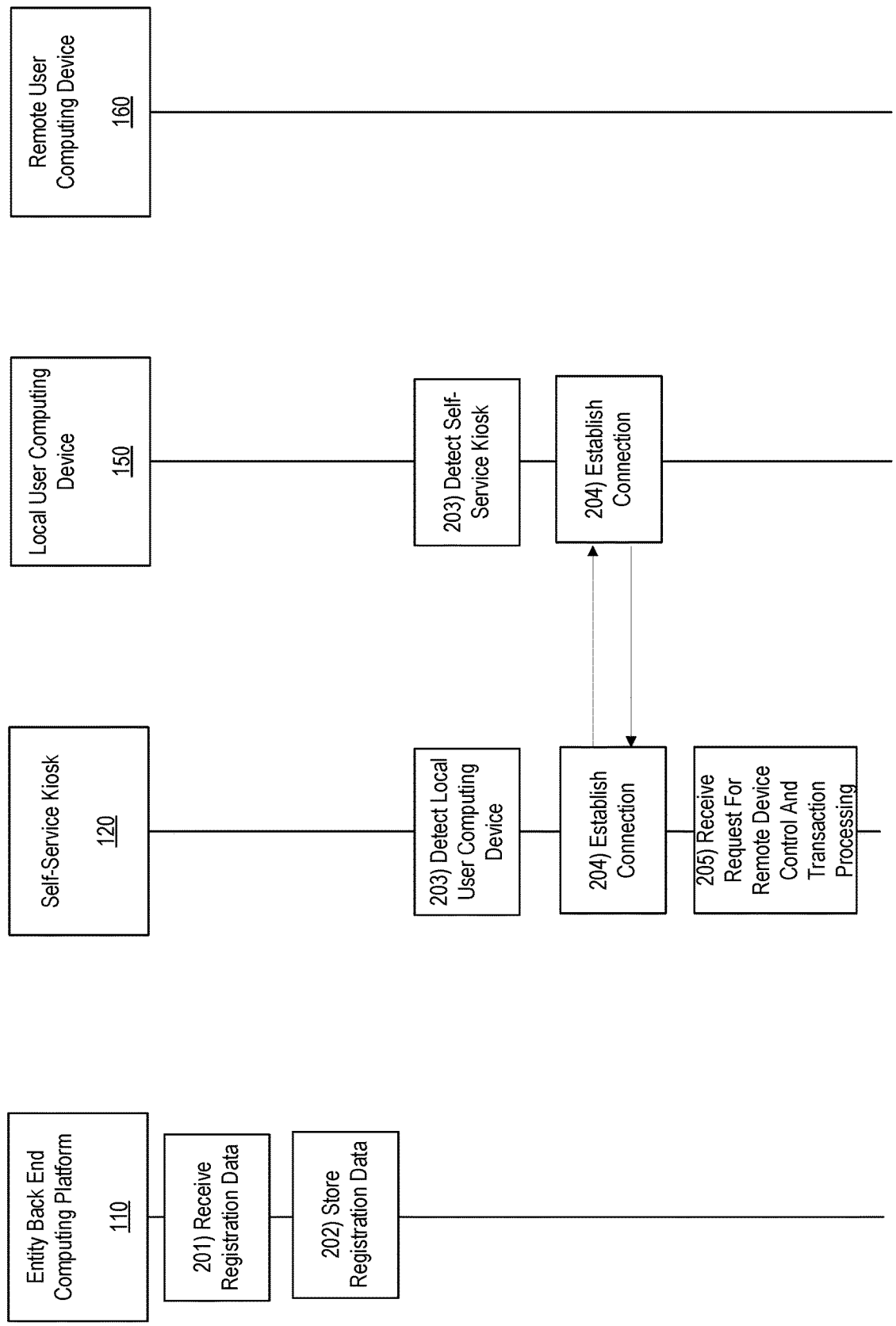
FIGS. 2A-2H depict an illustrative event sequence for implementing remote device control and transaction processing functions in accordance with one or more aspects described herein.

With reference to FIG. 2A, at step 201, entity back end computing platform 110 may receive registration data. For instance, entity back end computing platform 110 may receive registration data from a plurality of user devices (e.g., local user computing device 150, remote user computing device 160, and the like). In some examples, the registration data may include user identifiers, account identifiers, device identifiers, user authentication data, and the like. In some examples, registration data may include an indication of a user or user device who may act as a local device for a particular remote user (e.g., a remote user of remote user computing device 160 may identify a local user and local user computing device 150 as authorized to conduct remote transactions for the remote user).

At step 202, the entity back end computing platform 110 may store the received registration data.

At step 203, a device within a predefined range or proximity of a self-service kiosk may be detected. For instance, one or both of self-service kiosk 120 and local user computing device 150 may emit a signal that may be detected by the other of self-service kiosk 120 and local user computing device 150 when local user computing device 150 is within a predefined range or proximity of the self-service kiosk 120.

At step 204, upon detecting a presence of a device, local user computing device 150 may establish a connection with the self-service kiosk 120 to enable communication between the local user computing device 150 and the self-service kiosk 120. For instance, a short range wireless communication may be established using one or more short range wireless communication protocols, such as near field communication, Bluetooth™, Bluetooth LE™, and the like.

At step 205, self-service kiosk 120 may receive a request for remote device control and transaction processing. In some examples, the request may be received by the local user and may include user input selecting a remote device control option from a user interface displayed by a display of the self-service kiosk 120. FIG. 4 illustrates one example user interface 400 providing a selectable option to initiate a remote transaction.

Additionally or alternatively, upon establishing the connection between the local user computing device 150 and the self-service kiosk 120, user input requesting remote device control and transaction processing may be received by the local user computing device 150 and transmitted to the self-service kiosk 120. In some examples, the request for remote device control and transaction processing may include user identifiers associated with a remote user (e.g., a user located remotely from the self-service kiosk 120) and a remote user computing device 160, as well as a local user (e.g., a user local to or located within a predefined range or proximity of the self-service kiosk 120) and the local user computing device 150. For instance, user identifiers, device identifiers (e.g., IMEI, mobile phone number, and the like) may be received.

Figure 2B:
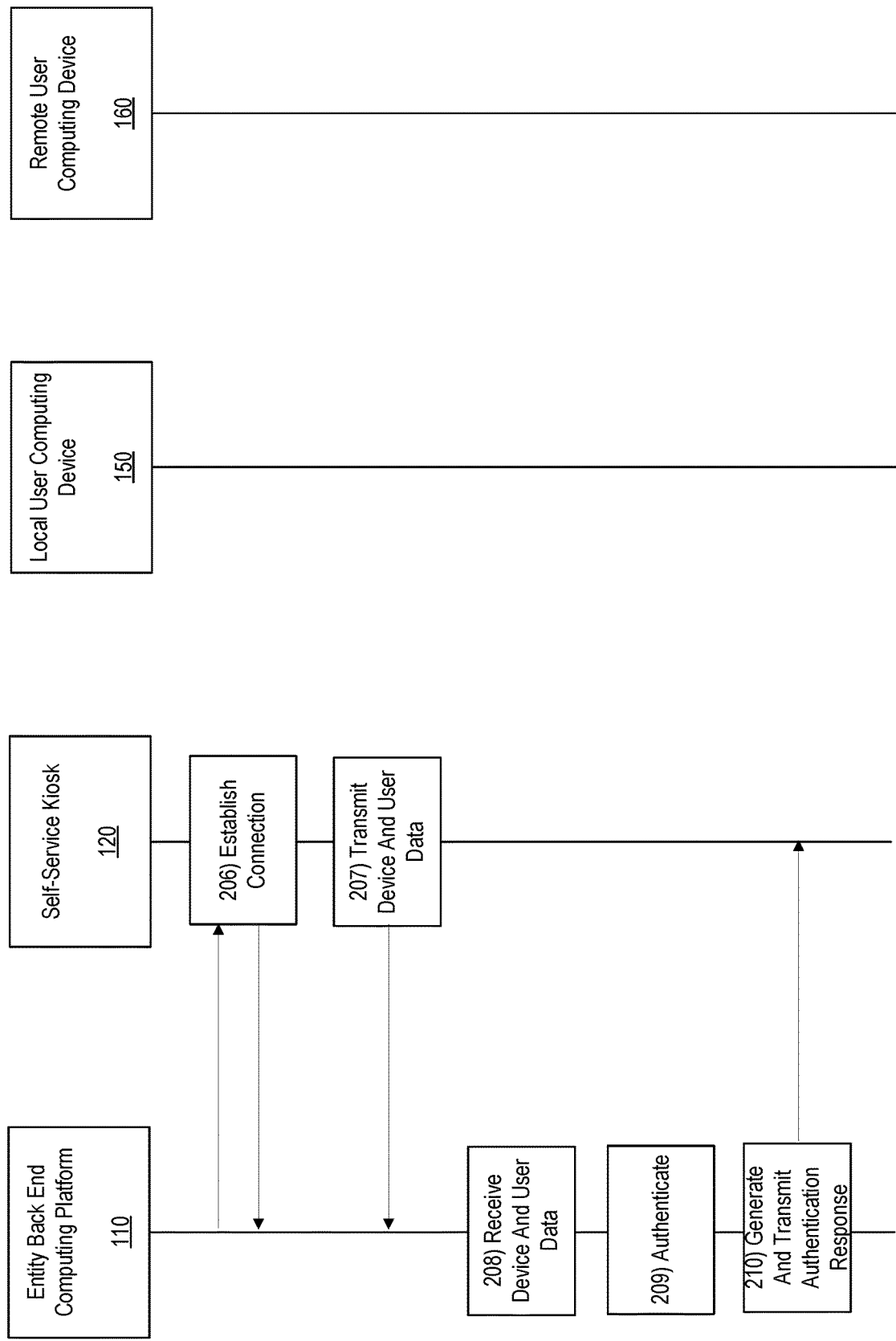

With reference to FIG. 2B, at step 206, self-service kiosk 120 may connect to entity back end computing platform 110. For instance, a wireless connection may be established between self-service kiosk 120 and entity back end computing platform 110. Upon establishing the wireless connection, a communication session may be initiated between self-service kiosk 120 and the entity back end computing platform 110.

At step 207, self-service kiosk 120 may transmit or send the device and user data received with the request for remote device control and transaction processing to the entity back end computing platform 110.

At step 208, entity back end computing platform 110 may receive the user and device data.

At step 209, based on the received user and device data, entity back end computing platform 110 may authenticate one or more users (e.g., local user, remote user, and the like), confirm that a local user is authorized to perform remote transactions for the remote user, and the like. In some examples, authentication may be based on an entity application executing on each of local user computing device 150 and remote user computing device 160.

At step 210, entity back end computing platform 110 may generate and transmit an authentication response to the self-service kiosk 120. In some examples, transmitting the authentication response to the self-service kiosk 120 may cause the self-service kiosk 120 to display the authentication response.

Figure 2C:
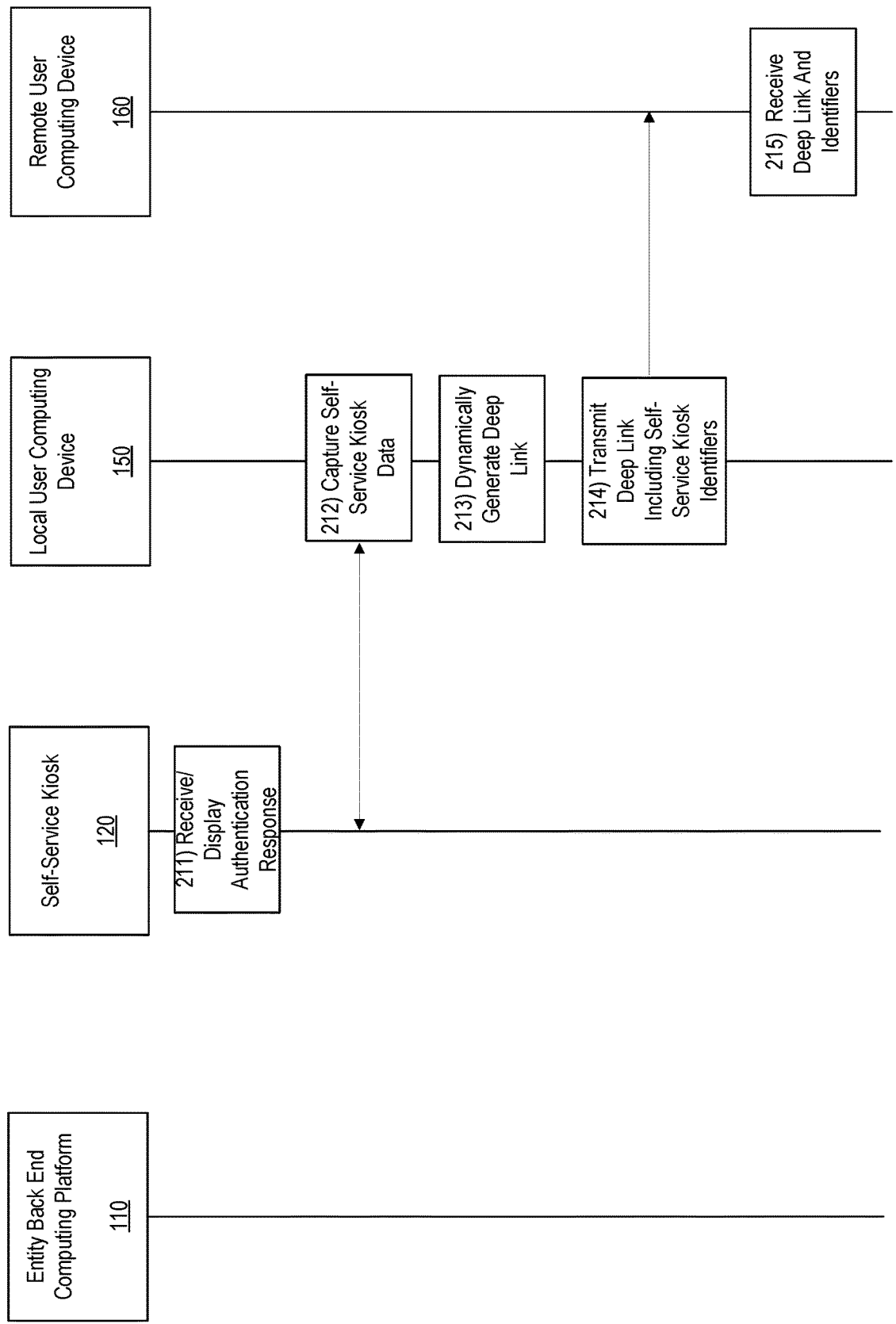

With reference to FIG. 2C, at step 211, self-service kiosk 120 may receive and display the authentication response.

At step 212, local user computing device 150 may receive or capture self-service kiosk identification data from the self-service kiosk 120. For instance, local user computing device 150 may capture a unique identifier associated with the self-service kiosk, geographic coordinates of a location of the self-service kiosk 120, and the like.

At step 213, local user computing device 150 may dynamically generate a deep link. In some examples, the deep link may be to the entity application executing on the remote user computing device 160 and the local user computing device 150.

At step 214, local user computing device 150 may transmit or send the dynamically generated deep link to the remote user computing device 160. In some examples, transmitting or sending the dynamically generated deep link may include transmitting or sending the self-service kiosk identification data captured for the self-service kiosk 120. In some examples, transmitting or sending the dynamically generated deep link and self-service kiosk identification information may include sending a user interface similar to interface 500 in FIG. 5 and causing the user interface 500 to be displayed on a display of remote user computing device 160. The interface 500 identifies a location of the self-service kiosk 120 at which the remote transaction is initiated, as well as the dynamically generated deep link that the remote user may select to begin remote transaction processing. If the remote user does not wish to proceed, the remote user may select "cancel" option.

At step 215, remote user computing device 160 may receive the deep link and self-service kiosk identification data. For instance, remote user computing device 160 may receive the user interface and may display the user interface including the deep link and self-service kiosk identification data.

Figure 2D:
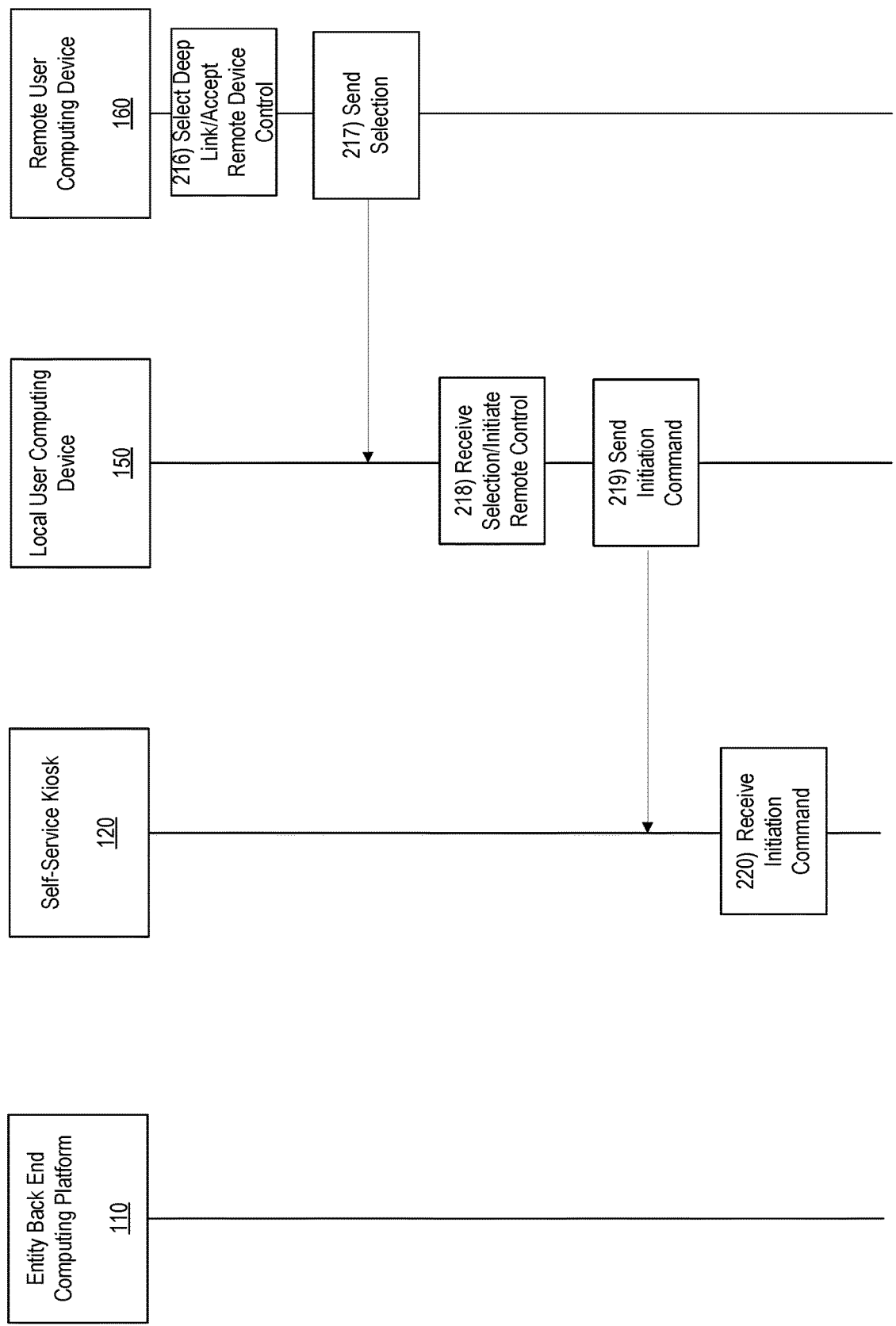

With reference to FIG. 2D, at step 216, remote user computing device 160 may receive user input selecting the deep link and accepting the initiated remote transaction processing session. For instance, a remote user may select the deep link displayed by the display of the remote user computing device 160 to accept the initiated remote transaction processing session. In some examples, selection of the deep link may bring the entity application executing on the remote user computing device 160 from a background to a foreground to display one or more user interfaces from the self-service kiosk 120 mimicking self-service kiosk interfaces.

At step 217, remote user computing device 160 may transmit or send an indication of the selection of the deep link to the local user computing device 150.

At step 218, local user computing device 150 may receive the indication of selection and may initiate or continue the remote transaction processing session. For instance, at step 219, local user computing device 150 may generate and send a command or instruction to the self-service kiosk 120 to initiate or continue the remote transaction processing.

At step 220, self-service kiosk 120 may receive the instruction or command and may execute the instruction or command. In some examples, executing the instruction or command may cause the self-service kiosk 120 to appear frozen or inoperable to users able to view the self-service kiosk 120 (e.g., the self-service kiosk 120 may display a welcome screen, hold screen, or the like). In other examples, executing the instruction or command may cause the self-service kiosk 120 to activate a digital twin device that may enable another user located at the self-service kiosk 120 to initiate a transaction that may be queued and processed after the remote transaction processing session is completed.

Figure 2E:
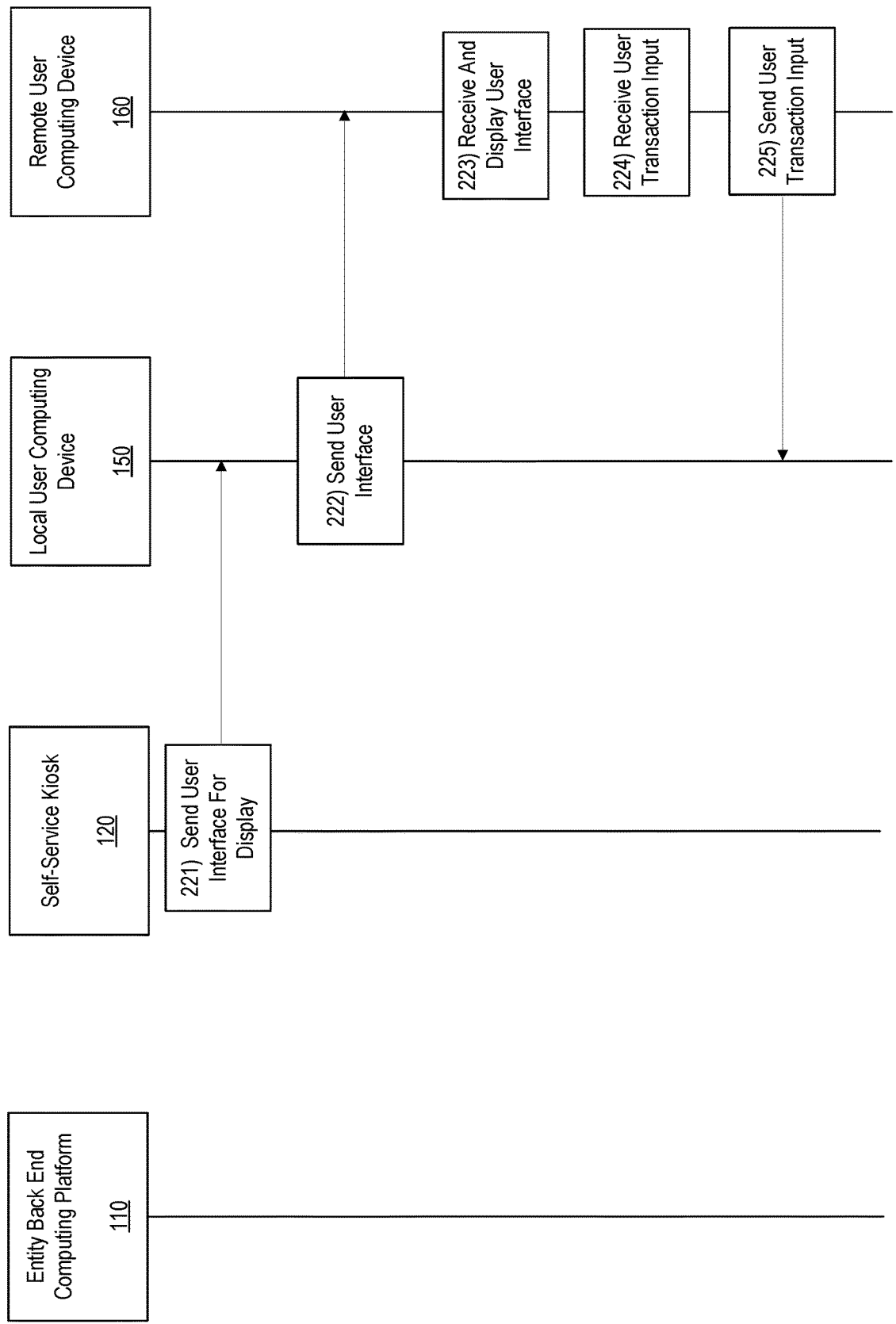

With reference to FIG. 2E, at step 221, self-service kiosk 120 may send a user interface for display to the local user computing device 150. For instance, self-service kiosk 120 may send, via the short range wireless communication connection, a user interface that would, in conventional transaction processing, appear on a display of the self-service kiosk and providing one or more selectable options, to the local user computing device 150. In some examples, sending the user interface may cause the local user computing device 150 to transmit or relay the user interface to the remote user computing device 160. In some arrangements, local user computing device 150 might not display the user interface and, instead, may automatically send the user interface to the remote user computing device 160.

Accordingly, at step 222, local user computing device 150 may receive the user interface from self-service kiosk 120 and may transmit or send the user interface to remote user computing device 160. In some examples, sending the user interface may cause the remote user computing device 160 to display the user interface on the display of remote user computing device 160 thereby mimicking the user interfaces or screens seen by a user located at the self-service kiosk 120.

Figure 6:
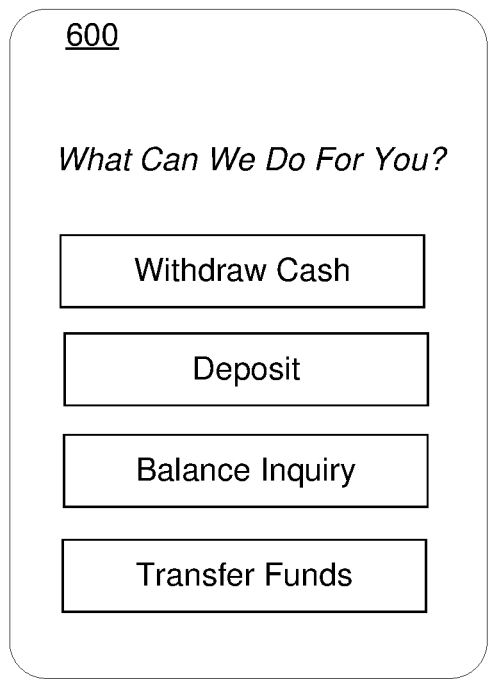

At step 223, remote user computing device 160 may receive and display the user interface. FIG. 6 illustrates one example mimicked user interface 600 that may be displayed by the display of remote user computing device 160. The user interface 600 includes options that would generally be available in a conventional, in-person, transaction at the self-service kiosk, such as withdrawal, deposit, and the like. However, the selection may be made by a user located remotely from the self-service kiosk 120.

At step 224, remote user computing device 160 may receive a user selection of an option from the displayed user interface. For instance, the user may select (e.g., via a touchscreen or other input device) an option for a transaction to be processed remotely.

At step 225, remote user computing device 160 may transmit or send the selection or user input to the local user computing device 150.

Figure 2F:
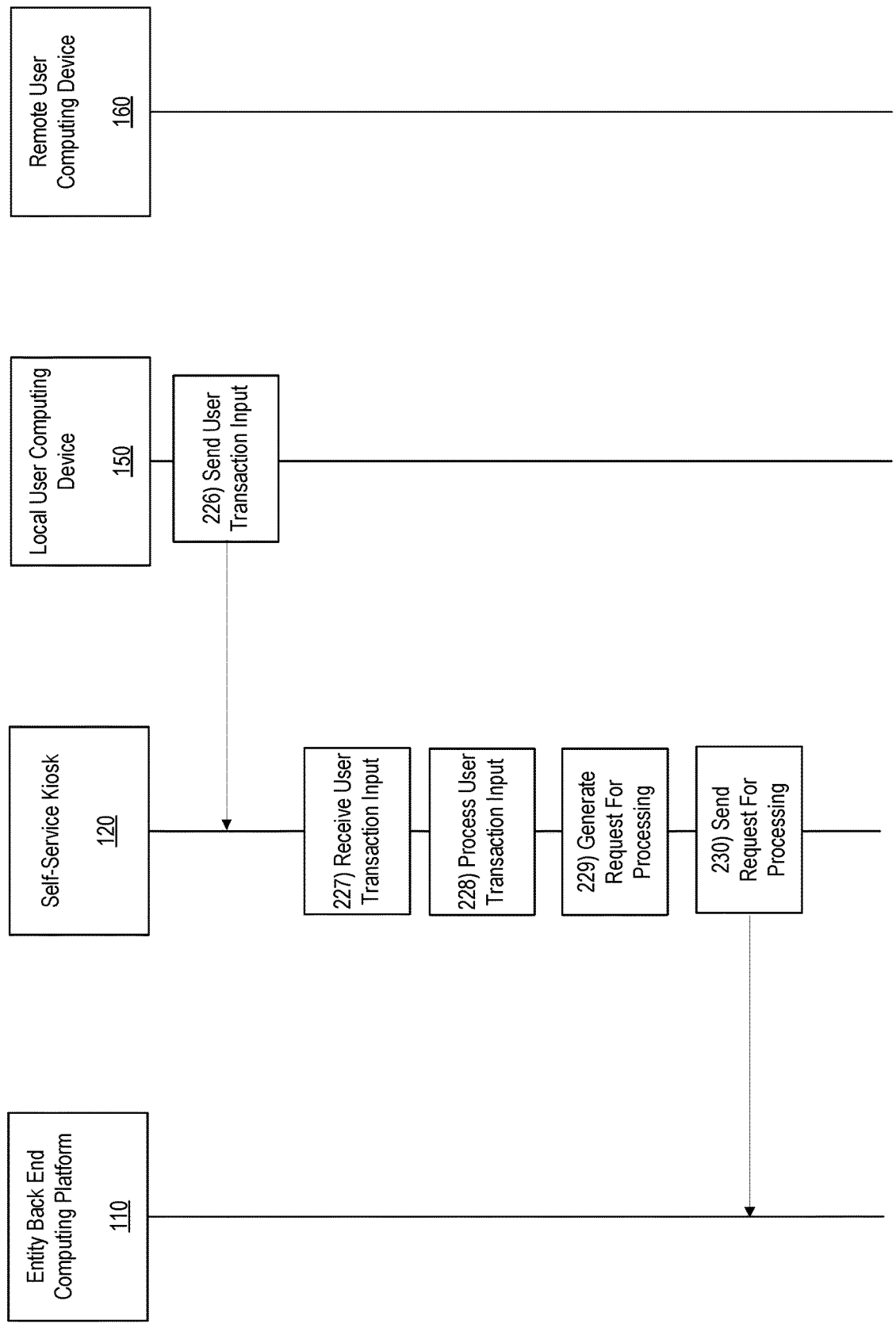

With reference to FIG. 2F, at step 226, local user computing device 150 may receive and transmit the user input selection data received from the remote user computing device 160 to the self-service kiosk 120.

At step 227, self-service kiosk 120 may receive the user input selection data and, at step 228, may process the user input selection data. In some examples, processing the user input selection data may cause a second user interface to be transmitted or mimicked to the local user computing device 150 and remote user computing device 160. For instance, if a user selects "withdraw funds," self-service kiosk may transmit a second user interface requesting an amount of funds, an account from which to withdraw funds, or the like. Accordingly, one or more of steps 221-228 may be repeated until all user selections or inputs to complete or process the transaction have been received.

Once all user input data has been received, at step 229, self-service kiosk 120 may generate a request for processing. For instance, self-service kiosk 120 may generate a request to withdraw a certain amount of funds from a particular account, deposit funds to an account, retrieve balance information, or the like.

At step 230, the generated request may be transmitted by the self-service kiosk 120 to the entity back end computing platform 110.

Figure 2G:
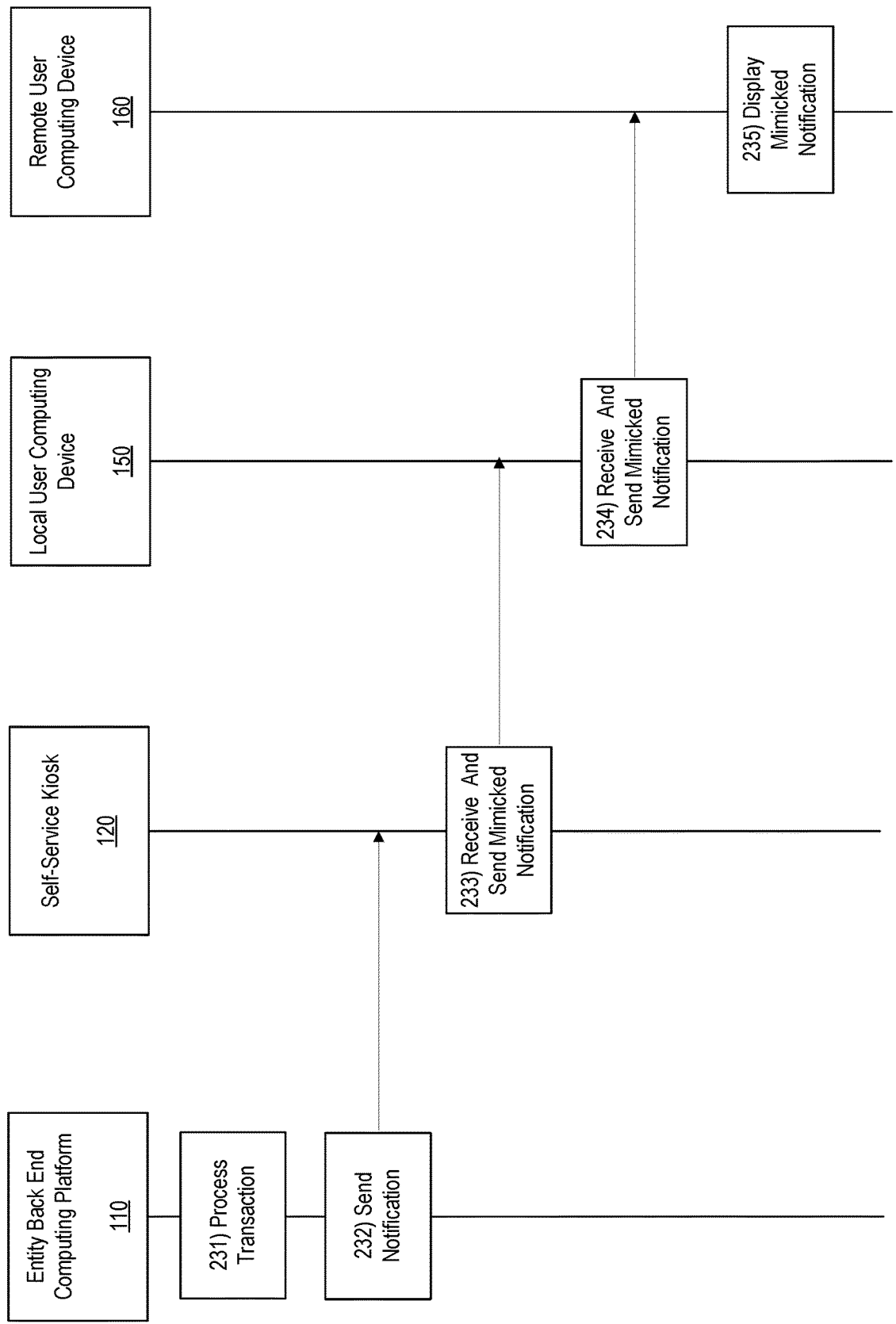

With reference to FIG. 2G, at step 231, entity back end computing platform 110 may process the requested transaction (e.g., in conjunction with the self-service kiosk 120). For instance, entity back end computing platform 110 may adjust an account ledger, retrieve balance data, or the like. In some examples, processing the transaction may include entity back end computing platform 110 communicating with one or more other entity systems.

At step 232, entity back end computing platform 110 may generate and transmit or send a notification indicating the transaction was processed to self-service kiosk 120. In some examples, the notification may include an instruction or command causing the self-service kiosk 120 to dispense funds, accept a deposit, provide balance information, or the like.

At step 233, self-service kiosk 120 may receive the notification and execute any instructions or commands to complete the transaction. For instance, the self-service kiosk may dispense requested funds (e.g., to the local user) or the like. The self-service kiosk may then transmit or send the notification of transaction processing (or another user interface indicating the transaction was processed) to the local user computing device 150.

At step 234, local user computing device 150 may receive the notification or user interface and transmit it to the remote user computing device 160 such that a mimicked version of a confirmation user interface may be displayed by a display of the remote user computing device 160. In some examples, local user computing device 150 might not display the notification or user interface and, instead, may relay the notification or user interface to remote user computing device 160 automatically.

Figure 7:
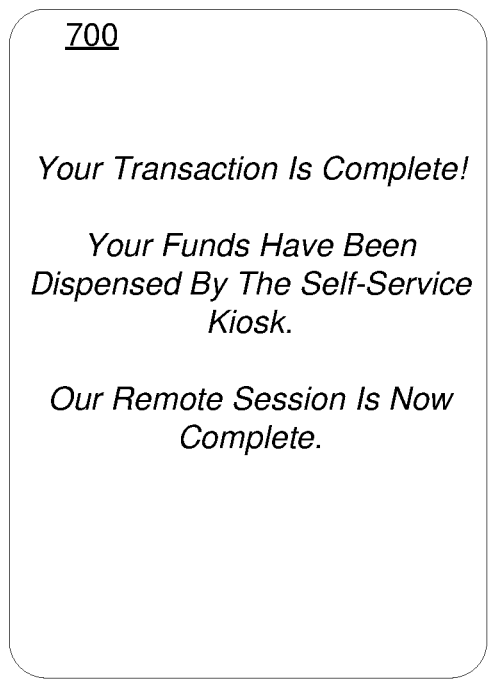

At step 235, remote user computing device 160 may receive and display the mimicked user interface indicating a confirmation of transaction processing. For instance, FIG. 7 includes one example user interface 700 that may be displayed by remote user computing device 160 indicating completion of the transaction. The interface 700 includes an indication that the transaction is complete and, in the case of a withdrawal, that funds have been dispensed. Various other user interfaces may be used without departing from the invention.

Figure 2H:
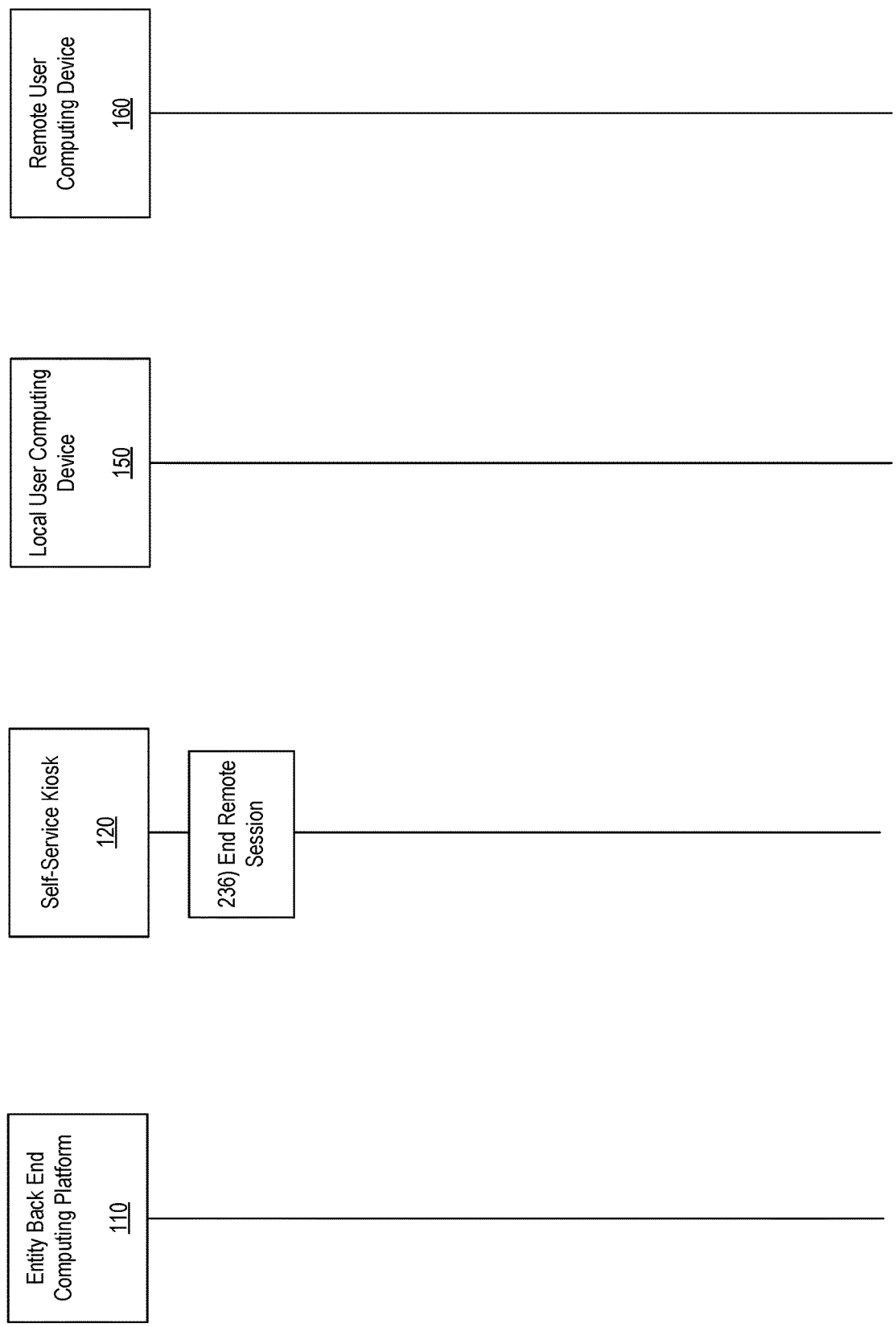

With reference to FIG. 2H, at step 236, as indicated in the user interface, the remote transaction processing session may terminate or end. Accordingly, the self-service kiosk 120 may terminate the short range wireless connection established, thereby removing the ability of the local user computing device 150 to communicate with the self-service kiosk 120 until another transaction or session is initiated.

Figure 3:
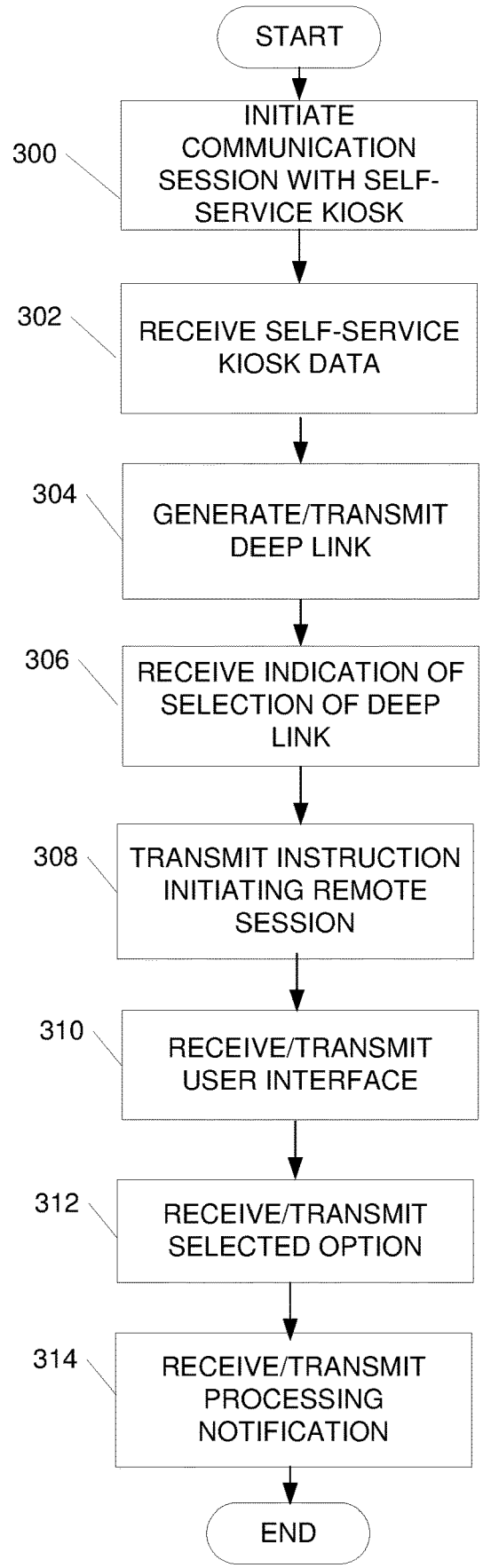
FIG. 3 depicts an illustrative method for implementing remote device control and transaction processing functions in accordance with one or more aspects described herein.

FIG. 3 is a flow chart illustrating one example method of implementing remote device control and transaction processing using deep linking in accordance with one or more aspects described herein. The processes illustrated in FIG. 3 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 3 may be performed in real-time or near real-time.

At step 300, local user computing device 150 (e.g., user computing device, such as a mobile device, associated with a user local or proximate to the self-service kiosk 120) may initiate a communication session with self-service kiosk 120. For instance, upon execution of a handshake between local user computing device 150 and self-service kiosk 120 (e.g., when local user computing device 150 is within a predetermined distance of the self-service kiosk 120) a communication session may be initiated between the self-service kiosk 120 and the local user computing device 150. In some examples, the communication session may be initiated using short range wireless communications.

At step 302, local user computing device 150 may receive self-service kiosk identifying data for the self-service kiosk 120. For instance, a unique identifier of self-service kiosk 120, geo-location data of the self-service kiosk 120, and the like, may be received by the local user computing device 150.

At step 304, via an application executing on the local user computing device 150, local user computing device 150 may generate a deep link (e.g., to a page or portion of the application executing on the local user computing device and the remote user computing device 160). In some examples, the deep link may include self-service kiosk 120 identifying data that may be used by a remote user to verify or authorize the transaction. The deep link may be transmitted by the local user computing device 150 to the remote user computing device 160 (e.g. via the application executing on the local user computing device 150 and the remote user computing device 160). In some examples, the application may be a mobile application associated with an entity or enterprise organization associated with the self-service kiosk. In some arrangements, the application may be a mobile banking application.

At step 306, an indication of selection of the deep link by the remote user computing device 160 may be received and a connection may be established between the local user computing device 150 and the remote user computing device 160 (e.g., via the application executing on both devices). Accordingly, a communication session or connection between the local user computing device 150 and the remote user computing device 160 may be initiated to enable selection of self-service kiosk options by the remote user via the remote user computing device 160.

At step 308, in response to the indication of selection of the deep link, local user computing device 150 may transmit or send an instruction or command to the self-service kiosk initiating a remote transaction processing session. In some examples, the instruction initiating the remote transaction processing session may cause the self-service kiosk to be inoperable or appear frozen to other users in an area of the self-service kiosk 120 until the remote transaction processing session is complete. In other examples, the instruction initiating the remote transaction processing session may activate a digital twin of the self-service kiosk 120. In some examples, the digital twin may be configured to receive transaction processing requests from other users (e.g., initiate a transaction at the self-service kiosk 120, provide user input via one or more user interfaces displayed on a display of the self-service kiosk 120, and the like) and queue the transaction processing requests for processing upon completion of the remote transaction processing session.

At step 310, local user computing device 150 may receive, from the self-service kiosk 120, a user interface including a plurality of selectable options. The local user computing device 150 may then transmit the user interface to the remote user computing device 160. In some examples, transmitting the user interface to the remote user computing device 160 may cause the remote user computing device 160 to display the user interface on a display of the remote user computing device 160.

At step 312, the local user computing device 150 may receive, from the remote user computing device 160, selection of an option of the plurality of selectable options provided in the user interface. For instance, a remote user may provide user input (e.g., via a touchscreen or other input device on the remote user computing device 160) selecting an option of the plurality of selectable options displayed in the user interface. The local user computing device 150 may then transmit or send the selected option to the self-service kiosk 120. In some examples, transmitting the selected option to the self-service kiosk 120 may cause the self-service kiosk to process the selected option. For instance, transmitting the selected option may cause the self-service kiosk 120 to dispense requested funds, receive items for deposit (e.g., open or activate a deposit receptacle), provide account balance information, or the like. In some examples, processing the selected option may include terminating the communication session between the self-service kiosk 120 and the local user computing device 150. In some examples, terminating the communication session may be performed after a notification indicating completion of the transaction is received by the local user computing device 150.

At step 314, the local user computing device 150 may receive, from the self-service kiosk 120, a notification of completion or processing of the transaction. The local user computing device 150 may then transmit the notification to the remote user computing device 160. In some examples, transmitting the notification to the remote user computing device 160 may cause the remote user computing device 160 to display the notification.

Accordingly, as discussed herein, arrangements to provide remote control of a device and remote transacting processing using deep linking are provided. By enabling a remote user to control a self-service kiosk located remotely from the remote user without divulging authentication credentials to another user, the remote user may securely conduct transactions at a self-service kiosk via a local user acting as a proxy for the remote user.

For instance, in some examples, upon initiating the remote transaction processing session, a first user interface may be transmitted from the self-service kiosk to the remote user computing device (e.g., via the local user computing device) requesting user authentication data (e.g., PIN, or the like). Additional user interfaces may then be mimicked on the remote user computing device to allow the remote user to select a type of transaction, and the like. In some examples, the authentication of the remote user may be based on the remote user's access to the application executing on the remote user computing device (e.g., authentication to the application) and the user interface requesting authentication data may be omitted.

As discussed herein, a deep link may be sent to the remote user computing device. In some examples, opening the deep link may cause the self-service kiosk screen to be mimicked on the remote user computing device. Accordingly, the remote user might not have to provide a card, PIN, or the like, to the local user to perform the transaction.

In some examples, a user may opt-in to the arrangements discussed herein. For instance, during a registration process the user may opt-in to permitting one or more users to initiate remote transactions on their behalf. In some examples, a remote user may identify one or more users who may act as local users to initiate transaction on their behalf.

Figure 8:
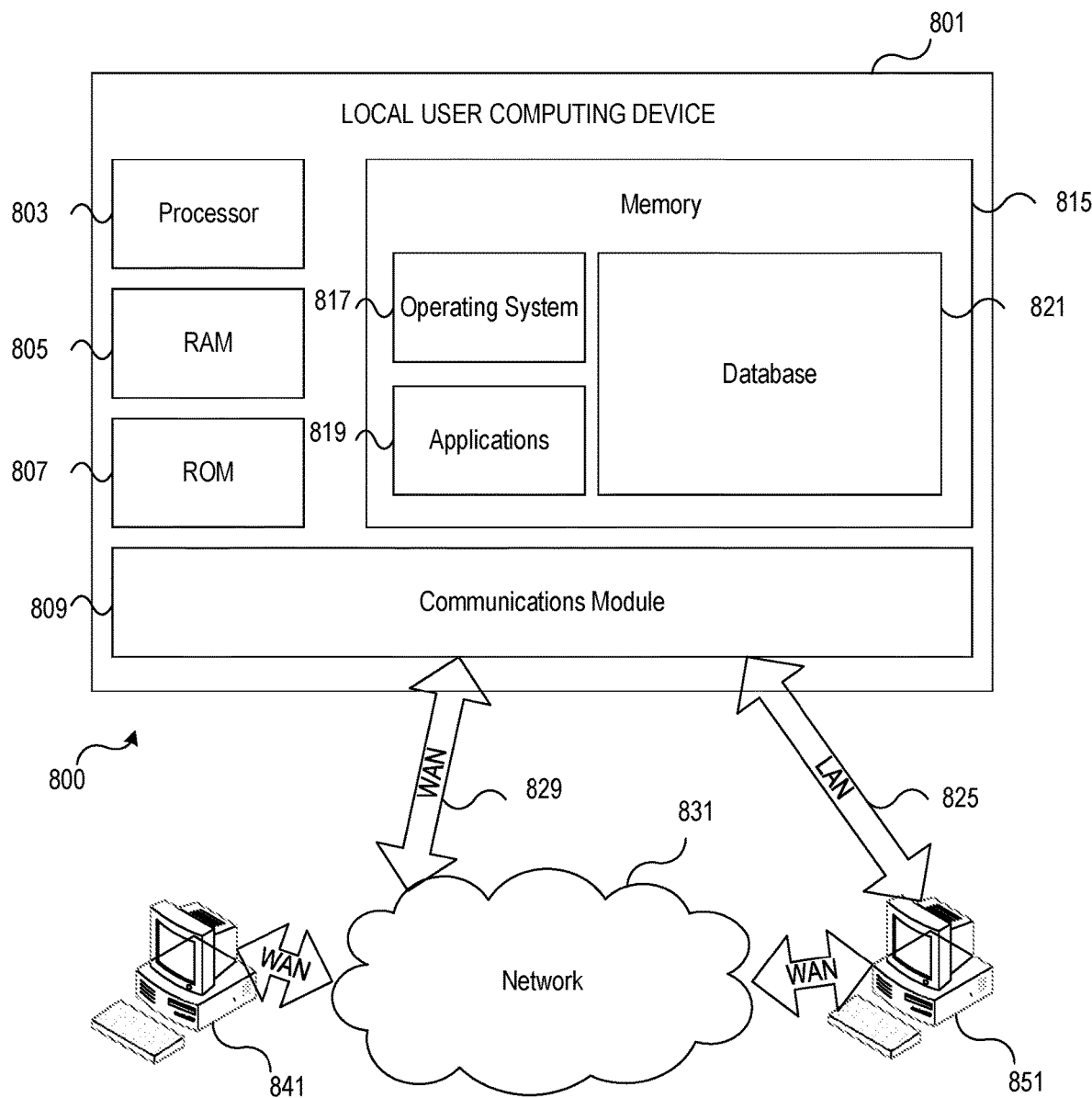
FIG. 8 illustrates one example environment in which various aspects of the disclosure may be implemented in accordance with one or more aspects described herein.

FIG. 8 depicts an illustrative operating environment in which various aspects of the present disclosure may be implemented in accordance with one or more example embodiments. Referring to FIG. 8, computing system environment 800 may be used according to one or more illustrative embodiments. Computing system environment 800 is only one example of a suitable computing environment and is not intended to suggest any limitation as to the scope of use or functionality contained in the disclosure. Computing system environment 800 should not be interpreted as having any dependency or requirement relating to any one or combination of components shown in illustrative computing system environment 800.

Computing system environment 800 may include local user computing device 801 having processor 803 for controlling overall operation of local user computing device 801 and its associated components, including Random Access Memory (RAM) 805, Read-Only Memory (ROM) 807, communications module 809, and memory 815. Local user computing device 801 may include a variety of computer readable media. Computer readable media may be any available media that may be accessed by local user computing device 801, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by local user computing device 801.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on local user computing device 801. Such a processor may execute computer-executable instructions stored on a computer-readable medium.

Software may be stored within memory 815 and/or storage to provide instructions to processor 803 for enabling local user computing device 801 to perform various functions as discussed herein. For example, memory 815 may store software used by local user computing device 801, such as operating system 817, application programs 819, and associated database 821. Also, some or all of the computer executable instructions for local user computing device 801 may be embodied in hardware or firmware. Although not shown, RAM 805 may include one or more applications representing the application data stored in RAM 805 while local user computing device 801 is on and corresponding software applications (e.g., software tasks) are running on local user computing device 801.

Communications module 809 may include a microphone, keypad, touch screen, and/or stylus through which a user of local user computing device 801 may provide input, and may also include one or more of a speaker for providing audio output and a video display device for providing textual, audiovisual and/or graphical output. Computing system environment 800 may also include optical scanners (not shown).

Local user computing device 801 may operate in a networked environment supporting connections to one or more other computing devices, such as computing device 841 and 851. Computing devices 841 and 851 may be personal computing devices or servers that include any or all of the elements described above relative to local user computing device 801.

The network connections depicted in FIG. 8 may include Local Area Network (LAN) 825 and Wide Area Network (WAN) 829, as well as other networks. When used in a LAN networking environment, local user computing device 801 may be connected to LAN 825 through a network interface or adapter in communications module 809. When used in a WAN networking environment, local user computing device 801 may include a modem in communications module 809 or other means for establishing communications over WAN 829, such as network 831 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A local user computing device, comprising:
at least one processor;
a communication interface communicatively coupled to the at least one processor; and
a memory storing computer-readable instructions that, when executed by the at least one processor, cause the local user computing device to:
initiate, via a short range wireless communication protocol, a communication session with a self-service kiosk;
receive, from the self-service kiosk, self-service kiosk identifying data;
generate a deep link to a mobile application executing on the local user computing device and a remote user computing device;
transmit the deep link to the remote user computing device, wherein the remote user computing device is located remotely from the local user computing device and the self-service kiosk;
receive an indication of selection of the deep link, wherein receiving the indication of the selection of the deep link connects the local user computing device to the remote user computing device and wherein selection of the deep link causes the mobile application executing on the remote user computing device to transition from a background to a foreground of the remote computing device to display one or more interfaces mimicking self-service kiosk interfaces;
transmit, to the self-service kiosk, an instruction initiating a remote transaction processing session;
receive, from the self-service kiosk, a first user interface including a plurality of selectable options and mimicking a first self-service kiosk interface;
transmit, to the remote user computing device, the first user interface mimicking the first self-service kiosk interface, wherein transmitting the first user interface to the remote user computing device causes the remote user computing device to display the first user interface on a display of the remote user computing device;
receive, from the remote user computing device, selection of an option of the plurality of selectable options on the first user interface mimicking the first self-service kiosk interface;
transmit, to the self-service kiosk, the received selection of the option of the plurality of selectable options, wherein transmitting, to the self-service kiosk the received selection of the option of the plurality of selectable options causes the self-service kiosk to process the selected option of the plurality of selectable options;

receive, from the self-service kiosk, a notification of processing of the option of the plurality of selectable options; and transmit, to the remote user computing device, the notification, wherein transmitting the notification causes the notification to display on the display of the remote user computing device.

2. The local user computing device of claim 1, wherein the local user computing device is located within a predefined distance of the self-service kiosk.

3. The local user computing device of claim 1, wherein causing the self-service kiosk to process the selected option further includes dispensing funds to a local user associated with the local user computing device and different from a remote user associated with the remote user computing device.

4. The local user computing device of claim 1, wherein causing the self-service kiosk to process the selected option further includes causing the self-service kiosk to terminate the communication session after processing the selected option.

5. The local user computing device of claim 1, wherein the mobile application executing on the local user computing device and the remote user computing device is a mobile application associated with an entity associated with the self-service kiosk.

6. The local user computing device of claim 5, wherein the mobile application executing on the local user computing device and the remote user computing device is a mobile banking application.

7. The local user computing device of claim 1, wherein the instruction initiating the remote transaction processing session causes the self-service kiosk to be inoperable to other users until the remote transaction processing session is complete.

8. The local user computing device of claim 1, wherein the instruction initiating the remote transaction processing session causes activation of a digital twin of the self-service kiosk configured to receive transaction processing requests from other users and queue the transaction processing requests for processing upon completion of the remote transaction processing session.

9. The local user computing device of claim 1, wherein the self-service kiosk identifying data includes a unique identifier of the self-service kiosk and geographic coordinates of a location of the self-service kiosk.

10. A method, comprising:
initiating, by a local user computing device, the local user computing device having at least one processor and memory, and via a short range wireless communication protocol, a communication session with a self-service kiosk;

receiving, by the at least one processor and from the self-service kiosk, self-service kiosk identifying data;

generating, by the at least one processor, a deep link to a mobile application executing on the local user computing device and a remote user computing device;

transmitting, by the at least one processor, the deep link to the remote user computing device, wherein the remote user computing device is located remotely from the local user computing device and the self-service kiosk;

receiving, by the at least one processor, an indication of selection of the deep link, wherein receiving the indication of the selection of the deep link connects the local user computing device to the remote user computing device and wherein selection of the deep link causes the mobile application executing on the remote user computing device to transition from a background to a foreground of the remote computing device to display one or more interfaces mimicking self-service kiosk interfaces;

transmitting, by the at least one processor and to the self-service kiosk, an instruction initiating a remote transaction processing session;

receiving, by the at least one processor and from the self-service kiosk, a first user interface including a plurality of selectable options and mimicking a first self-service kiosk interface;

transmitting, by the at least one processor and to the remote user computing device, the first user interface mimicking the first self-service kiosk interface, wherein transmitting the first user interface to the remote user computing device causes the remote user computing device to display the first user interface on a display of the remote user computing device;

receiving, by the at least one processor and from the remote user computing device, selection of an option of the plurality of selectable options on the first user interface mimicking the first self-service kiosk interface;

transmitting, by the at least one processor and to the self-service kiosk, the received selection of the option of the plurality of selectable options, wherein transmitting, to the self-service kiosk the received selection of the option of the plurality of selectable options causes the self-service kiosk to process the selected option of the plurality of selectable options;

receiving, by the at least one processor and from the self-service kiosk, a notification of processing of the option of the plurality of selectable options; and transmitting, by the at least one processor and to the remote user computing device, the notification, wherein transmitting the notification causes the notification to display on the display of the remote user computing device.

11. The method of claim 10, wherein the local user computing device is located within a predefined distance of the self-service kiosk.

12. The method of claim 10, wherein causing the self-service kiosk to process the selected option further includes dispensing funds to a local user associated with the local user computing device and different from a remote user associated with the remote user computing device.

13. The method of claim 10, wherein causing the self-service kiosk to process the selected option further includes causing the self-service kiosk to terminate the communication session after processing the selected option.

14. The method of claim 10, wherein the mobile application executing on the local user computing device and the remote user computing device is a mobile application associated with an entity associated with the self-service kiosk.

15. The method of claim 14, wherein the mobile application executing on the local user computing device and the remote user computing device is a mobile banking application.

16. The method of claim 10, wherein the instruction initiating the remote transaction processing session causes the self-service kiosk to be inoperable to other users until the remote transaction processing session is complete.

17. The method of claim 10, wherein the instruction initiating the remote transaction processing session causes activation of a digital twin of the self-service kiosk configured to receive transaction processing requests from other users and queue the transaction processing requests for processing upon completion of the remote transaction processing session.

18. One or more non-transitory computer-readable media storing instructions that, when executed by a local user computing device comprising at least one processor, memory, and a communication interface, cause the local user computing device to:
- initiate, via a short range wireless communication protocol, a communication session with a self-service kiosk;
- receive, from the self-service kiosk, self-service kiosk identifying data;
- generate a deep link to a mobile application executing on the local user computing device and a remote user computing device;
- transmit the deep link to the remote user computing device, wherein the remote user computing device is located remotely from the local user computing device and the self-service kiosk;
- receive an indication of selection of the deep link, wherein receiving the indication of the selection of the deep link connects the local user computing device to the remote user computing device and wherein selection of the deep link causes the mobile application executing on the remote user computing device to transition from a background to a foreground of the remote computing device to display one or more interfaces mimicking self-service kiosk interfaces;
- transmit, to the self-service kiosk, an instruction initiating a remote transaction processing session;
- receive, from the self-service kiosk, a first user interface including a plurality of selectable options and mimicking a first self-service kiosk interface;
- transmit, to the remote user computing device, the first user interface mimicking the first self-service kiosk interface, wherein transmitting the first user interface to the remote user computing device causes the remote user computing device to display the first user interface on a display of the remote user computing device;
- receive, from the remote user computing device, selection of an option of the plurality of selectable options on the first user interface mimicking the first self-service kiosk interface;
- transmit, to the self-service kiosk, the received selection of the option of the plurality of selectable options, wherein transmitting, to the self-service kiosk the received selection of the option of the plurality of selectable options causes the self-service kiosk to process the selected option of the plurality of selectable options;
- receive, from the self-service kiosk, a notification of processing of the option of the plurality of selectable options; and
- transmit, to the remote user computing device, the notification, wherein transmitting the notification causes the notification to display on the display of the remote user computing device.

19. The one or more non-transitory computer-readable media of claim 18, wherein causing the self-service kiosk to process the selected option further includes dispensing funds to a local user associated with the local user computing device and different from a remote user associated with the remote user computing device.

20. The one or more non-transitory computer-readable media of claim 18, wherein the instruction initiating the remote transaction processing session causes the self-service kiosk to be inoperable to other users until the remote transaction processing session is complete.

* * * * *